Dec. 18, 1934.  E. SCHELLER  1,985,061
MEASURING DRUM FOR SCREW MICROMETERS
Filed Jan. 28, 1933
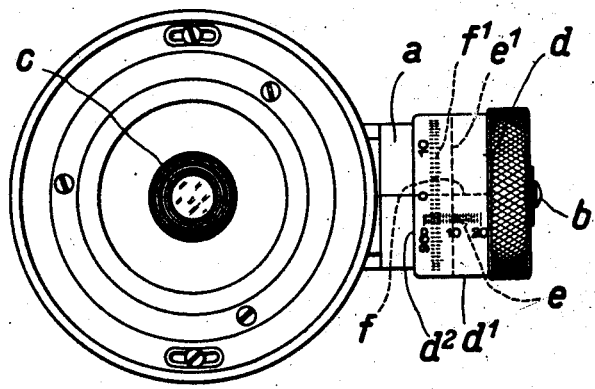
Inventor:
Ernst Scheller Patented Dec. 18, 1934

1,985,061

UNITED STATES PATENT OFFICE 1,985,061

MEASURING DRUM FOR SCREW-MICROMETERS

Ernst Scheller, Jena, Germany, assignor to firm Carl Zeiss, Jena, Germany

Application January 28, 1933, Serial No. 654,045
In Germany February 3, 1932

1 Claim. (Cl. 33—166)

I have filed an application in Germany, February 3, 1932.

The reading devices of screw micrometers, as are used for instance with screw-micrometers for general purposes, with eye-piece micrometers of optical instruments, and the like, generally have two scales which are provided, respectively, on the fixed part of the micrometer, so as to indicate complete rotations of the gauging screw, and on the free end of the measuring drum, so as to permit reading the fractions of a complete rotation. The indices for these two scales are, respectively, the free edge of the measuring drum itself and a line on the fixed part of the micrometer. Making the said free edge provide an index is not practical, because this edge is to have in this case a certain thickness in order to be protected from alterations due to use and wear. This increased thickness renders a reading more difficult, and the measuring drum prevents the user of the instrument from seeing part of the scale. Although this construction is undesired in any case, it has not been possible so far to replace it by another.

According to the invention, that part of the measuring drum which glides over the scale indicating complete rotations is transparent and provided with an index for this scale, the drum edge being no longer required to bear an index. The said drum part is given the requisite transparency by making it of glass, celluloid, or the like.

The scale for the reading of the fractions of a complete rotation is conveniently provided on the transparent part of the drum, at a certain distance from the drum edge, and this in order to completely dispense with using this edge. To avoid the possibility of a parallax between the scales and their indices, it is appropriate to provide the index and the scale of the measuring drum on the interior surface of this drum.

The accompanying drawing, which illustrates the invention, represents by way of example a measuring drum used in connection with an eyepiece micrometer.

In a bearing $a$ is disposed a gauging screw $b$. On this bearing $a$, which represents the fixed part of the micrometer and is connected to an ocular $c$, is rotatably disposed a drum $d$ fixed to the screw $b$. The cylindrical part $d^1$ of this drum $d$ is of glass. The surface of the fixed part, that is to say of the bearing $a$, is provided with a scale $e$ and an index $f$. The glass cylinder $d^1$, the free edge of which is designated $d^2$, has on its interior surface a scale $f^1$ and an index $e^1$. Complete rotations of the drum $d$ are indicated on the scale $e$ by the index $e^1$, and the fractions of a complete rotation on the scale $f^1$ by the index $f$.

It follows from the above that the edge $d^2$ of the drum $d$ is no longer required for the reading and need therefore not bear any scale.

I claim:

A measuring drum for screw micrometers, having at its front part an index for indicating the complete rotations of the micrometer screw and a scale for indicating the fractions of a complete rotation of the said screw, both the index and the scale extending circumferentially of the said part, at least this front part of the drum being of a transparent material, the said index and the said scale being disposed on the interior surface of the front part, and the index and the scale being spaced from the edge of this part.

ERNST SCHELLER.